No. 618,291. Patented Jan. 24, 1899.
J. POYSER.
LET-OFF AND TAKE-UP MECHANISM FOR LOOMS.
(Application filed Nov. 23, 1896.)
(No Model.) 4 Sheets—Sheet 1.
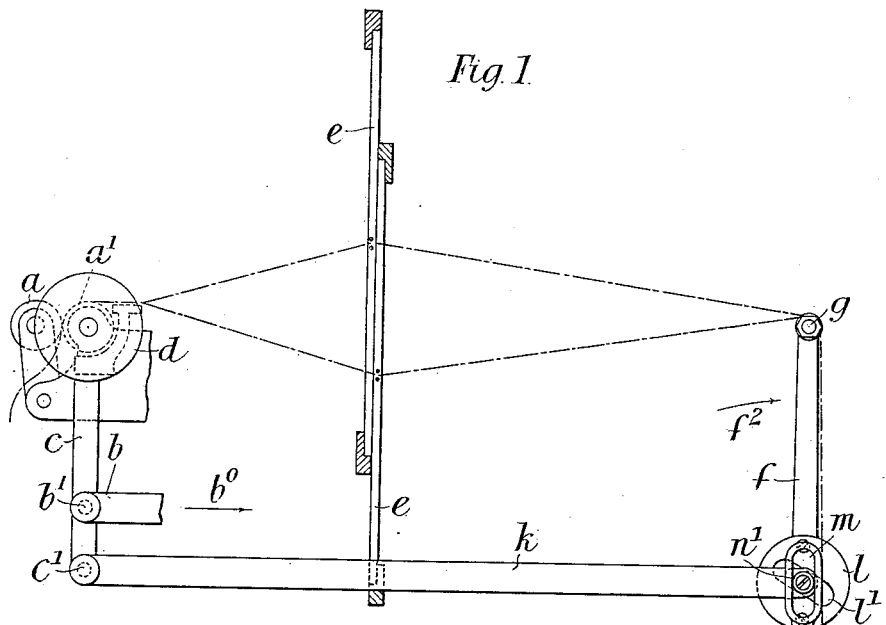
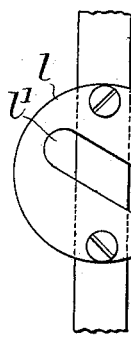
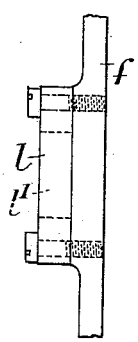
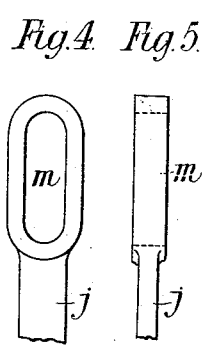
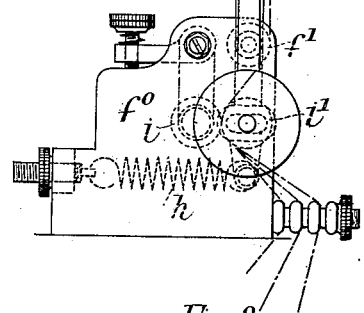
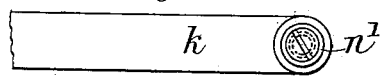
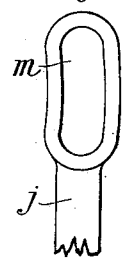
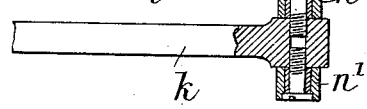
Witnesses
F. L. Middleton
C. S. Middleton
Inventor
John Poyser
by Fitherstonhaugh & Co.
attys No. 618,291. Patented Jan. 24, 1899.
J. POYSER.
LET-OFF AND TAKE-UP MECHANISM FOR LOOMS.
(Application filed Nov. 23, 1896.)
(No Model.) 4 Sheets—Sheet 2.
Fig. 1ª
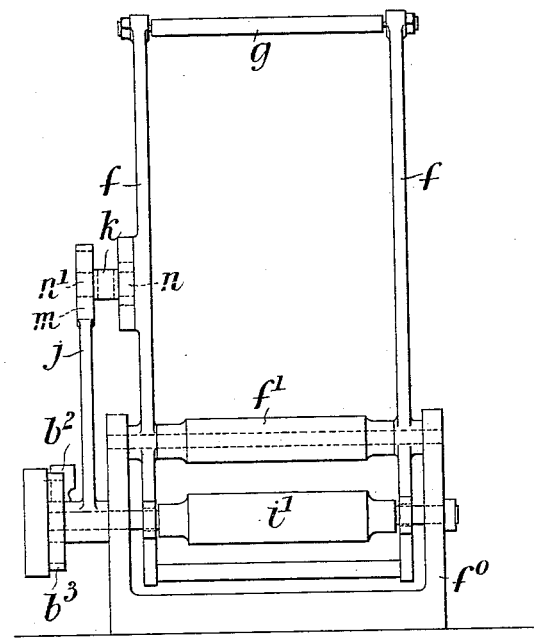
Fig. 1ᵇ
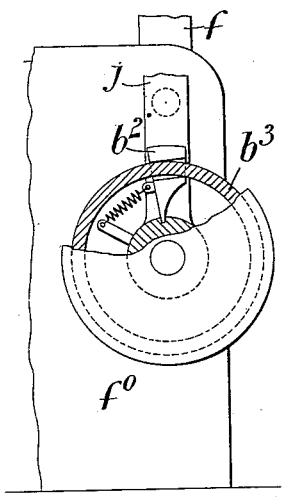
Witnesses
Inventor
John Poyser No. 618,291. Patented Jan. 24, 1899.
J. POYSER.
LET-OFF AND TAKE-UP MECHANISM FOR LOOMS.
(Application filed Nov. 23, 1896.)
(No Model.) 4 Sheets—Sheet 3.
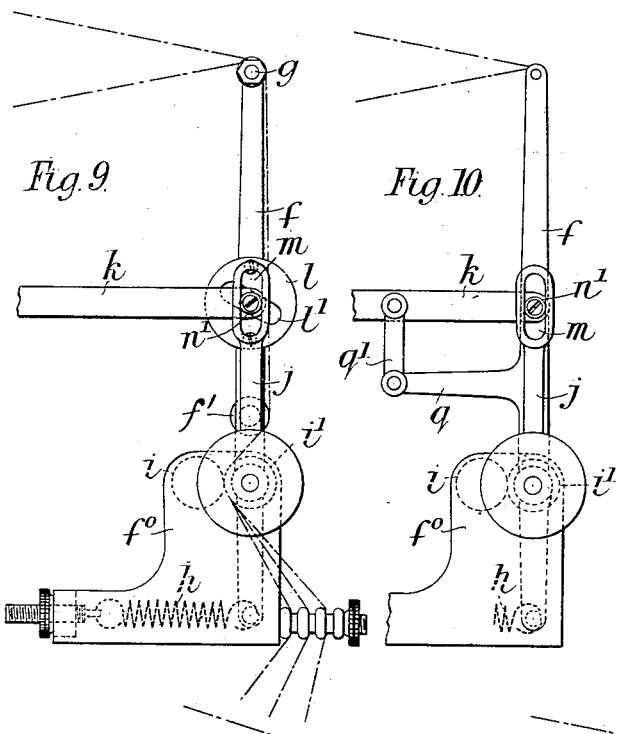
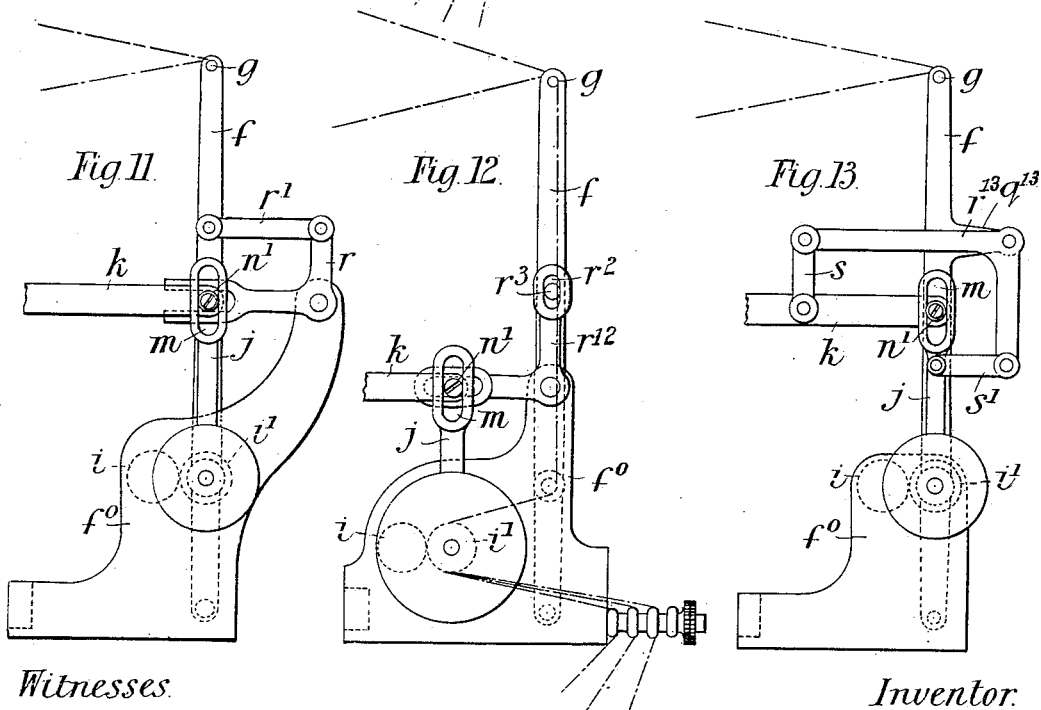
Witnesses.
Inventor.
John Poyser
by Fetherstonhaugh & Co.
attys

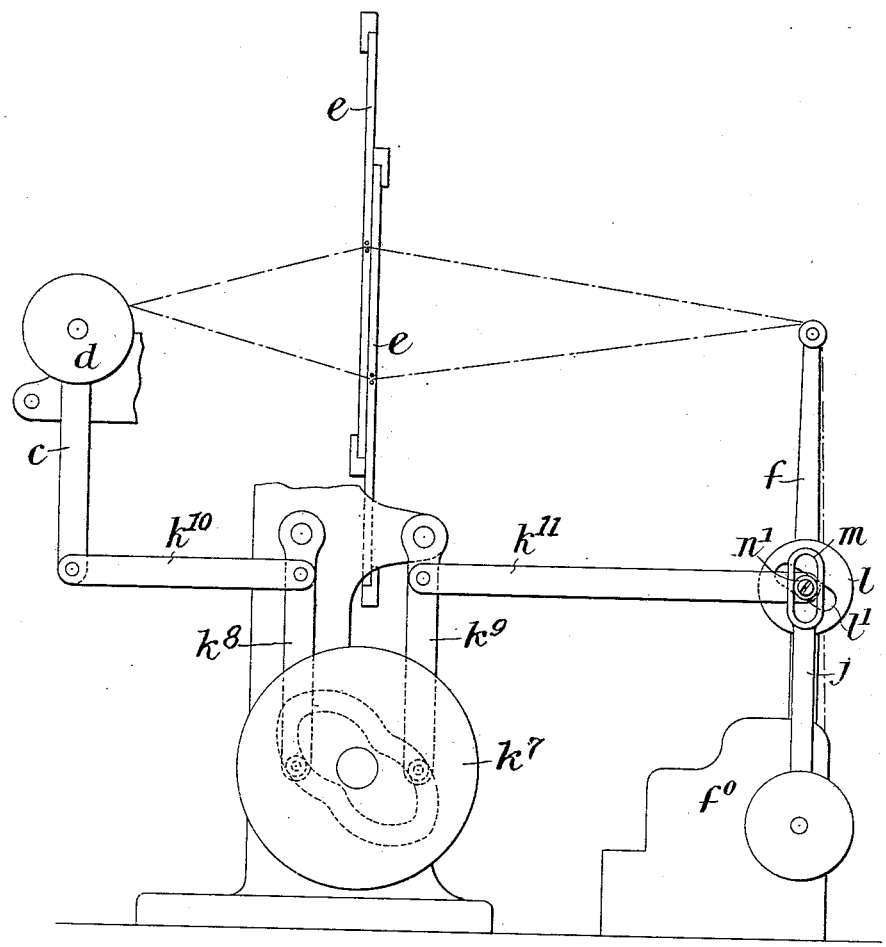

UNITED STATES PATENT OFFICE.

JOHN POYSER, OF WIRKSWORTH, ENGLAND.

LET-OFF AND TAKE-UP MECHANISM FOR LOOMS.

SPECIFICATION forming part of Letters Patent No. 618,291, dated January 24, 1899.

Application filed November 23, 1896. Serial No. 613,148. (No model.)

*To all whom it may concern:*

Be it known that I, JOHN POYSER, a subject of the Queen of Great Britain, residing at Wirksworth, near Derby, England, have invented new and useful Improvements in Let-Off and Take-Up Mechanism for Looms, of which the following is a specification.

This invention has been patented to me in the following countries: England, No. 1,061, dated January 15, 1896; Canada, No. 54,466, dated December 28, 1896; Austria, No. 47/150, dated January 18, 1897; Belgium, No. 124,370, dated November 4, 1896; Italy, Vol. XXXII, No. 43,050, Vol. LXXXIV, No. 273, dated December 31, 1896; France, No. 261,002, dated November 4, 1896; Spain, No. 19,879, dated January 4, 1897; India, No. 418, dated June 7, 1897; Switzerland, No. 13,499, dated November 5, 1896; Sweden, No. 8,134, dated November 5, 1896, and Denmark, No. 1,381, dated December 23, 1897.

This invention relates to let-off motions for looms, and has for its object to provide a let-off which shall be positively operated to unwind or feed forward on each take-up movement a length of warp equal to that taken up on each take-up movement (notwithstanding that, owing to the bending of the warp-threads around the weft laid in the shed in weaving, a slightly-greater amount of woven warp is taken up on each take-up movement than would be taken up if the weft-thread were not so laid and woven up and that, owing to the irregularly-varying thickness in each warp and weft thread, this slightly-greater amount of woven warp taken up is very frequently varied) and so obviate the variations in the tension of the warp-threads which would otherwise arise.

According to my invention the let-off is operated coincidently with a positive take-up, either by a direct connection with the take-up lever or with some other going part of the loom, the point at which movement is imparted to the let-off lever by the connecting device being made variable to admit of the effective length of the let-off lever being varied. The point at which movement is so imparted is determined by an oscillating frame which moves under the opening and closing of the shed by the heddles and the slight variations in the position of the arc of oscillation of which are utilized to vary the said point.

To enable my invention to be fully understood, I will describe the same by reference to the accompanying drawings.

Figure 1 is a side view illustrating one form of my improvements. Fig. 1$^a$ is a rear end view of the same. Fig. 1$^b$ is a detail view of the gripping-pawls. Figs. 2 and 3 are views of a detail at right angles to each other. Figs. 4 and 5 are similar views of another detail, and Figs. 6 and 7 are a side view and a sectional plan view illustrating another detail. Fig. 8 is a modification of the detail shown in Figs. 4 and 5. Figs. 9, 10, 11, 12, and 13 are side views illustrating five modifications of my invention. Fig. 14 is a diagrammatic view hereinafter referred to.

Similar letters of reference indicate corresponding parts in the several figures.

$a$ $a'$ are the take-up rollers of a loom, of which the roller $a'$ is positively operated from a suitable cam on the driving-shaft of the loom through the medium of a rod $b$, jointed to a lever $c$ at the point $b'$, the said lever carrying a gripping-pawl engaging with a flange on a wheel $d$, fixed to the shaft of the roller $a'$, as described in the specification of former patent, No. 547,130, and as shown in Fig. 1$^b$ of the accompanying drawings, in which $b^2$ indicates the gripping-pawl, and $b^3$ the flange.

$e$ $e$ are the heddles of the loom, and $f$ is the oscillating frame, hereinafter called the "vibrator." This vibrator is pivoted in a suitable bracket $f^0$, fixed to or formed in one piece with the loom-framing, the pivot being in the form of a bar for carrying a roller $f'$. At the upper end of the vibrator is a bar or roller $g$, around which and the roller $f'$ the warp-threads pass from the let-off rollers, and connected to its lower end is or are a spring or springs $h$, tending constantly to move the vibrator in the direction indicated by the arrow $f^2$, Fig. 1, the movement of the vibrator in the reverse direction being due to the opening of the shed and shortenings in the length of the warps between the fell of the fabric and the delivering-point of the let-off rollers.

$i$ $i'$ are the let-off rollers, of which the operating-roller $i'$ is of the same diameter as the operating-roller of the take-up rollers. As the axis of the feed-roller $i'$ is immediately beneath that of the vibrator, the side bars of the latter are slotted to straddle the shaft of said roller. As shown, the roller $i'$ is positively driven by feed mechanism, of similar construction to that employed for operating the take-up rollers and the pawl of which is carried by the let-off lever $j$. This lever $j$ is connected by the rod $k$, which has a constant movement, with the take-up lever $c$. The operating let-off and take-up rollers being of the same diameter, if their actuating-levers $j$ and $c$ are of the same length and definitely connected together then owing to the bending of the warps around the weft and the take-up roller operating on the woven fabric the amount of warp taken up on each movement of the take-up roller is slightly greater (in varying amounts for reasons before stated) than the amount let off, and the length of warp between the fell of the woven fabric and the delivering-point of the let-off rollers is shorter after the take-up has operated than before. In consequence of this the vibrator when the shed is closed cannot move quite so far away from the heddles under the action of its spring or springs $h$ as would be the case if the same amount of warp had been let off as taken up, and the vibrator is therefore deflected from the position it occupied on the immediately-preceding closing of the shed. I avail myself of this liability to deflection for accomplishing the object of my invention, and one mode of carrying out my invention is as follows—that is to say, on the side of the vibrator $f$ I fix the plate or disk $l$, having formed in it the slot $l'$, (shown drawn to an enlarged scale in Figs. 2 and 3,) and I provide the let-off lever $j$ with the slot $m$, as shown in Figs. 4 and 5, which illustrate the end of the let-off lever $j$ drawn to an enlarged scale.

On the end of the connecting-rod $k$ most remote from the take-up lever $c$ I fix two rollers $n$ $n'$, as shown in Figs. 6 and 7, (which represent the parts referred to drawn to an enlarged scale,) the roller $n$ entering the slot $l'$ and the roller $n'$ the slot $m$.

The slots $l'$ $m$ are conveniently so placed or arranged that when the let-off lever $j$ and the vibrator $f$ are respectively in their mean positions the rollers $n$ and $n'$ will be at about the center of the length of the slots $l'$ and $m$, as shown in Fig. 1, the distance of the center of slot $m$ from the axis of lever $j$ being the same as that of axis $c'$ from the axis of lever $c$. The effect of this disposition of parts is as follows: As the vibrator is drawn toward the heddles by the opening of the shed the roller $n'$ (having the position of its axis determined by the influence of slot $l'$ on roller $n$) will be lowered in the slot $m$, and as the vibrator is drawn from the heddles by its spring $h$ on the closing of the shed the said roller will be raised in the said slot. The position which the said roller will occupy in the said slot during the period when thrust is exerted upon the lever $j$ by the connecting-rod $k$ will thus be determined by the position of the arc of oscillation of the vibrator during each successive stroke of the heddles. When the position of that arc is nearer to the heddles, the thrust through the said roller upon lever $j$ will be exerted at a point nearer the axis of the said lever, which will thus have its oscillatory movement increased, and when the position of that arc is farther away from the heddles the thrust through the said roller upon lever $j$ will be exerted at a point farther from the axis of the said lever, which will thus have its oscillatory movement diminished. When the oscillatory movement of lever $j$ is increased, more warp is let off. When that movement is diminished, less warp is let off. It thus follows that as the position of the arc of oscillation of the vibrator is nearer to the heddles more warp is let off and as the position of that arc is farther from the heddles less warp is let off. Whether the arc of oscillation for any single stroke of the heddles will be nearer to or farther from the heddles than on the immediately-preceding stroke is determined by the relation of the length of warp between the fell of the fabric and the delivering-point of the let-off rollers to that on the immediately-preceding stroke. When the said length is reduced, the said arc will be nearer them, and vice versa. It thus follows that as the length of warp is reduced the amount of warp let off is increased, and vice versa. If on any stroke less warp is let off than is taken up, the said length will be reduced, and vice versa. It thus follows that any tendency to deficiency or excess in the amount of warp let off will result in the letting off of more or less warp.

As the effective length of lever $j$ and its amount of oscillation may be increased or diminished beyond or below that of lever $c$, the amount of warp let off will thus tend to be constantly equalized with the amount taken up. The position of the arc of oscillation of the vibrator and the amount of warp let off will thus tend to be constant about a mean, and any artificially-induced extreme deficiency or excess of warp and consequent variation in the position of the said arc of oscillation will be compensated for until the said mean is again obtained. The amount of warp let off is thus self-regulated or self-determined, and the tension on the warp-threads is thus automatically adjusted and kept absolutely or approximately constant.

To obviate the movement of lever $j$ and consequent feeding forward of warp resulting from the movement of roller $n'$ through the arc of a circle having its center at the center of pivot $c'$, (a movement additional to that imparted by the let-off-operating mechanism,) the slot $m$ may be curved to an arc of a circle having its center at the point $c'$, as shown in Fig. 8.

The angle at which the slot $l'$ is placed relatively with the slot $m$ can be varied according to the amount of warp desired to be let off for any given variation in the position of the arc of oscillation of the vibrator. For instance, the more nearly the slot $l'$ approaches the horizontal the less alteration will a given variation in the position of the arc of oscillation of the vibrator cause in the operative (or thrusting) position of roller $n'$ in the slot $m$, while the more nearly the slot $l'$ approaches the vertical the greater will be the alteration. To permit of varying this quantity, the disk $l$, having the slot $l'$ in it, may be attached to the vibrator-frame by means which permit of adjustment.

In the modification of my invention shown in Fig. 9 the arrangement of the mechanism is substantially the same as hereinbefore described, the only difference being that the vibrator $f$ instead of being pivoted on an independent axis, as shown in Fig. 1, is pivoted on the axis of the let-off roller $i'$. In this modification the guide-roller $f'$ is mounted above the axis of oscillation of the vibrator upon an axle carried by the side bars of the said vibrator.

In the modification of my invention shown in Fig. 10 the position of the roller $n'$ in the slot $m$ of the let-off lever $j$ instead of being varied by means of a slotted plate $l$ and roller $n$ is varied by means of an arm $q$, formed upon the vibrator $f$ and connected by a link $q'$ with the connecting-rod $k$. In this figure the vibrator $f$ is represented as being pivoted on the axis of the let-off roller $i'$, as in Fig. 9.

In the modification of my invention shown in Fig. 11 the arrangement is substantially the same as that shown in Fig. 10, except that I dispense with the arm $q$ and substitute therefor a bell-cranked lever $r$, one arm of which is slotted to engage with the roller $n$ on the end of the connecting-rod $k$, while the other arm is connected by a link $r'$ to the vibrator $f$, the said lever $r$ being pivoted at its elbow upon a fixed axis in the frame of the loom.

In the modification shown in Fig. 12 the arrangement is substantially the same as that shown in Fig. 11, except that the vibrator and let-off roller have independent axes and that instead of connecting the bell-crank lever $r^{13}$ with the vibrator by means of a link I provide a slot $r^2$ in the vertical arm of the bell-crank lever and a pin $r^3$ on the side of the vibrator, which pin projects into the slot $r^2$.

In the modification shown in Fig. 13 the bell-crank lever $r^{13}$ instead of being pivoted upon the frame of the loom, as in Figs. 11 and 12, is pivoted upon an extension $q^{13}$ upon the vibrator $f$, one arm of the lever $r^{13}$ being connected to the rod $k$ by a link $s$ and the other arm to the let-off lever $j$ by means of a link $s'$.

Although I have described the take-up and let-off levers as connected by a rod $k$, which is given a constant movement, both may be operated separately from any suitable going parts of the loom. For instance, the rod $k$ might be arranged in connection with a cam having a constant movement or the like, similar to that used for operating the take-up lever $c$, and in this case instead of the take-up and let-off levers being operated simultaneously the take-up lever may be actuated at any selected time alternately with the let-off lever. Such an arrangement is shown in Fig. 14, where both the take-up and let-off are represented as being independently operated from one cam. It will be obvious, however, that separate operating-cams could be employed.

In Fig. 14 the cam-disk is shown at $K^7$, having a cam-track on one face of the same, into which projections from pivoted arms $K^8$ $K^9$ extend. The arms are thus vibrated by the vibration of the cam. A rod $K^{10}$ extends from the arm $K^8$ to the take-off-operating lever C for actuating the same, and a corresponding rod $K^{11}$ connects the arm $K^9$ with the let-off-operating lever and vibrator.

The arrangement of mechanism hereinbefore described for operating the positively-driven roller of a pair of let-off rollers may also be used in connection with a warp-beam, the gripping-pawl feed mechanism simply serving for positively rotating the beam from which the warps are drawn.

I wish it understood that the above arrangements are only given as examples of my invention, there being various other mechanical arrangements whereby alterations in the position of the arc of oscillation of the vibrator may be made to determine the effective length of the let-off lever.

Having now particularly described and ascertained the nature of my said invention and in what manner the same is to be performed, I declare that what I claim is—

1. In a loom for weaving, the combination of positive take-up mechanism having an operating-lever, positive let-off mechanism also having an operating-lever, a rod or rods with means for operating the same to actuate said operating-levers, the point of connection between the lever of the let-off mechanism and the operating-rod through which it receives its motion being variable, a vibrator extending the warps between the fell of the fabric and the delivering-point of the let-off rollers or warp-beam and allowing of deflection on the opening or closing of the shed and on variation arising in the length of the warps between the said points and a device on said vibrator for supporting the movable end of the said operating-rod of the let-off lever whereby variations in the length of the said warps serve to vary the point of connection between the lever of the let-off mechanism and its operating-rod, substantially as described.

2. In combination in a loom, positively-operating take-up mechanism, a let-off roll, a lever having a ratchet connection therewith for operating the same, a vibrator, a rod independent of said vibrator, means for reciprocating the same, said rod being directly and movably connected to said lever, and means interposed between the vibrator and said connection for varying the position of the same as the position of the vibrator varies.

3. In a loom for weaving, in combination the take-up mechanism, the let-off rolls, the heddles, the vibrator, the lever for operating said rolls, the reciprocating rod independent of said vibrator for actuating said lever, and the means for varying the distance between the power and the fulcrum of said lever directly as the length of warp between the fell and the let-off rollers varies, substantially as described.

4. In combination in a loom, the take-up mechanism positively operated, the let-off rolls, the heddles, the lever, operating mechanism to feed the let-off rolls, the reciprocating rod independent of the vibrator and means for reciprocating said rod for operating the same having a constant movement, the vibrator, and a variable connection between said rod and the lever controlled by said vibrator, substantially as described.

5. In combination, in a loom, the heddles, the take-up rolls positively operated, the let-off rolls, the lever for operating the same, the vibrator and the rod having a variable connection with said lever and also with said vibrator and adapted to extend in between the same, the point of connection between said rod and lever depending upon the points of connection between the rod and the vibrator, substantially as described.

JOHN POYSER.

Witnesses:
HUME C. PINSENT,
HERBERT G. WESTLEY.